Feb. 26, 1963  C. W. BOLLUM, SR  3,078,938
EARTH-SKIMMING AIR VEHICLE
Filed Dec. 16, 1959  9 Sheets-Sheet 1

INVENTOR
Carl W. Bollum, Sr.
BY
ATTORNEY

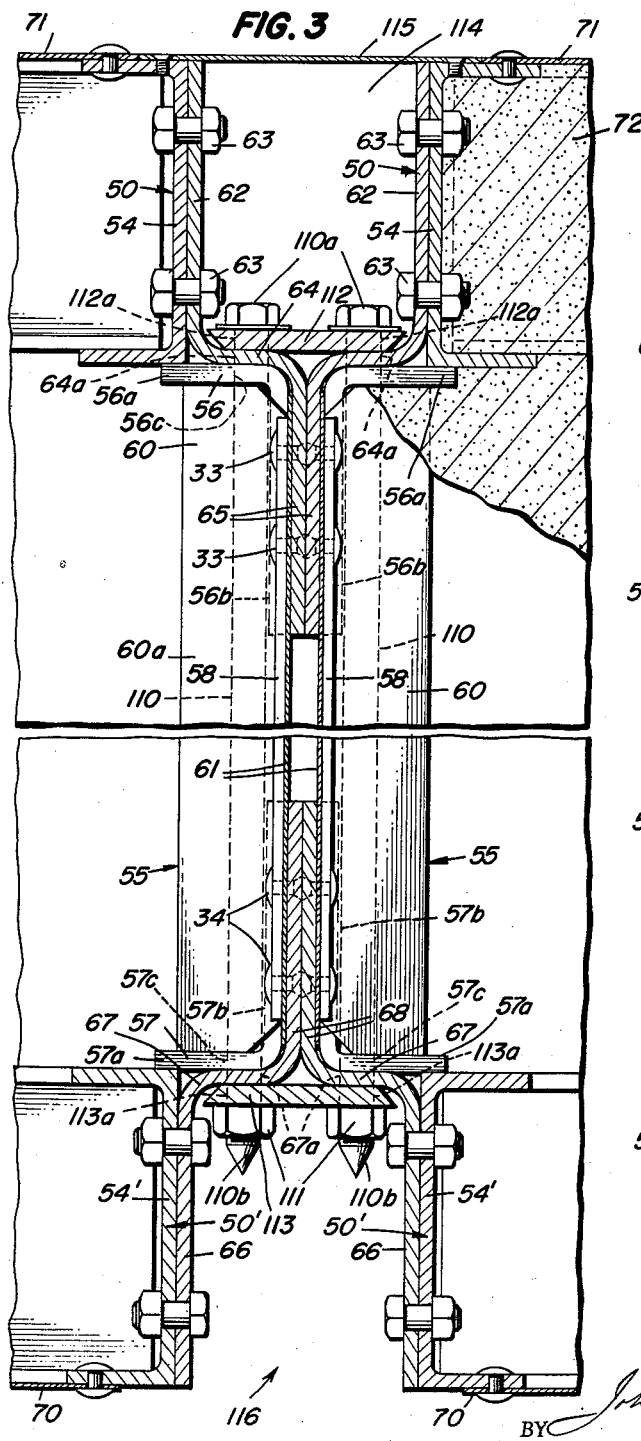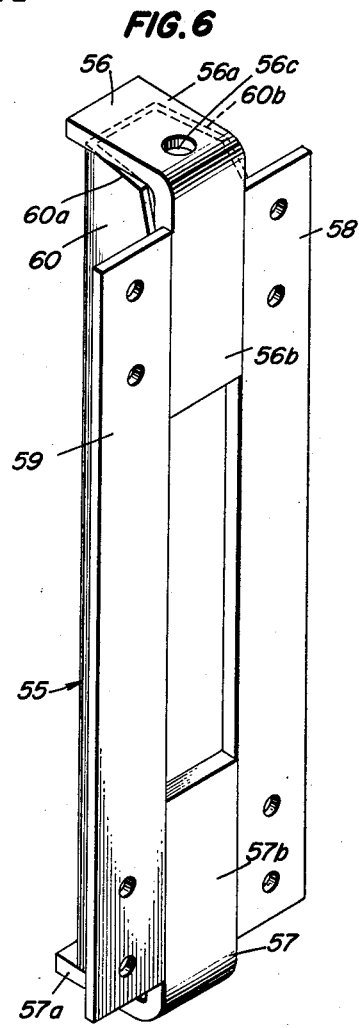
INVENTOR
Carl W. Bollum, Sr.

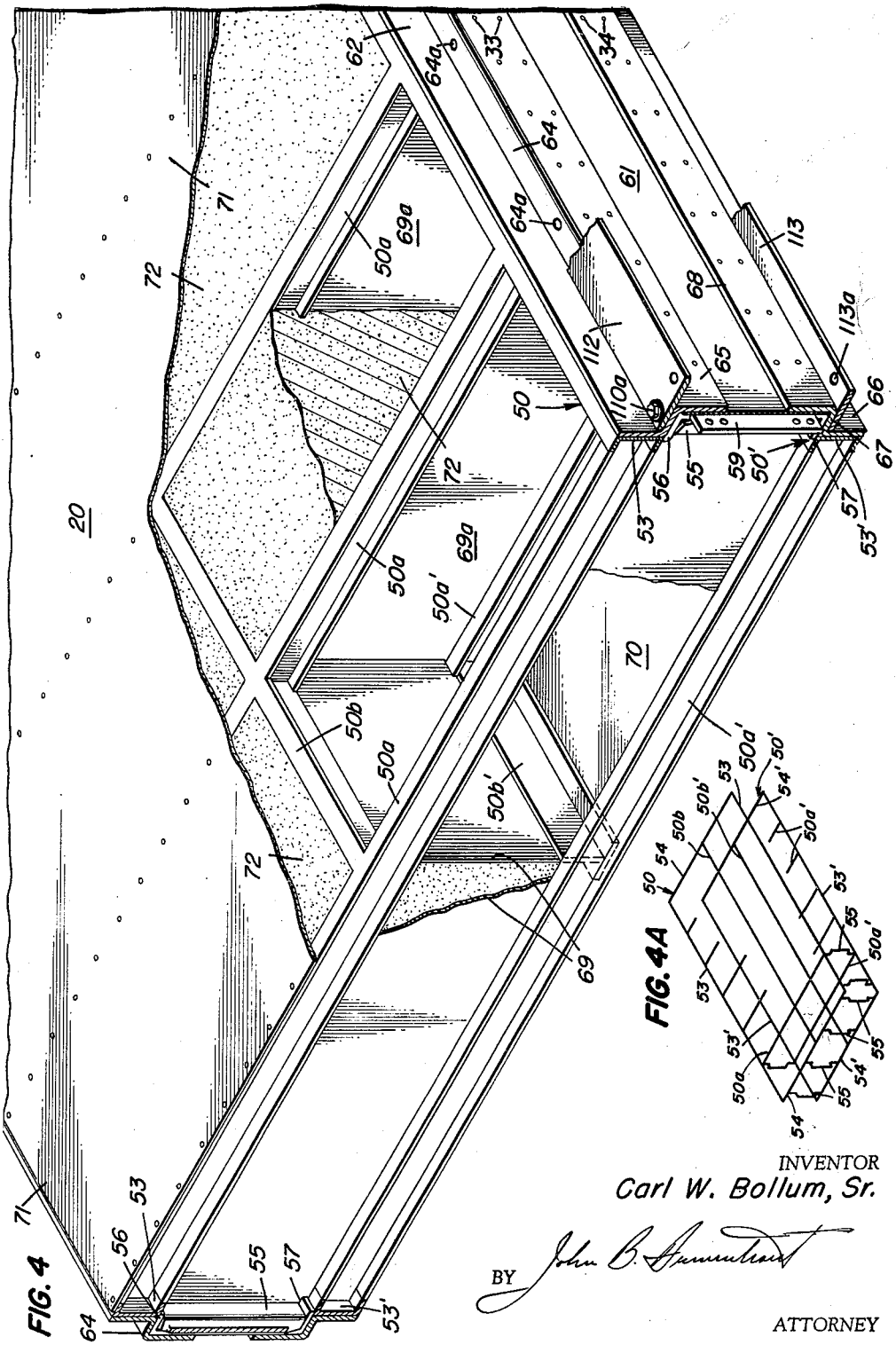

Feb. 26, 1963  C. W. BOLLUM, SR  3,078,938
EARTH-SKIMMING AIR VEHICLE
Filed Dec. 16, 1959  9 Sheets-Sheet 4
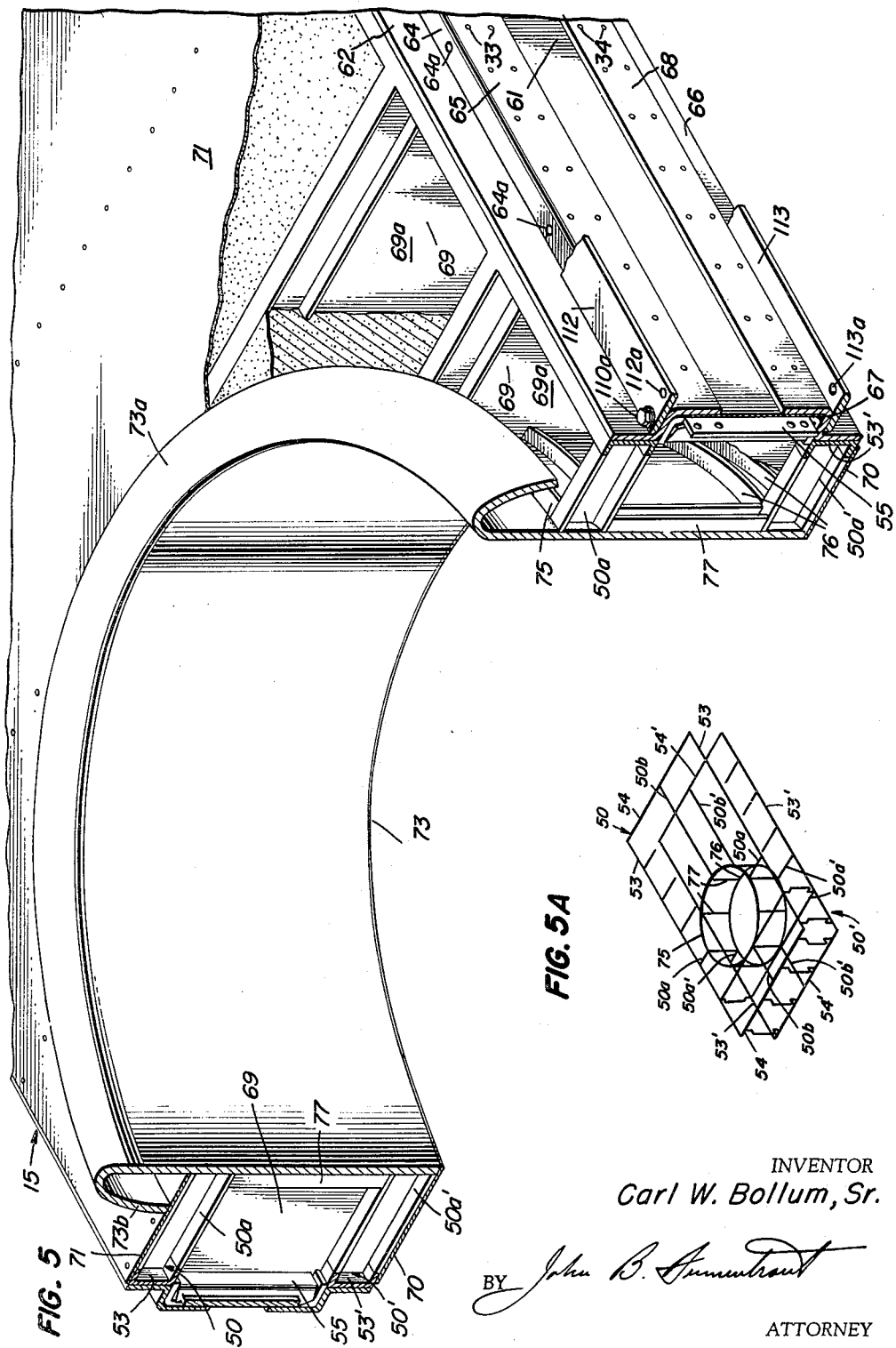
INVENTOR
Carl W. Bollum, Sr.
BY  John B. Summitrout
ATTORNEY

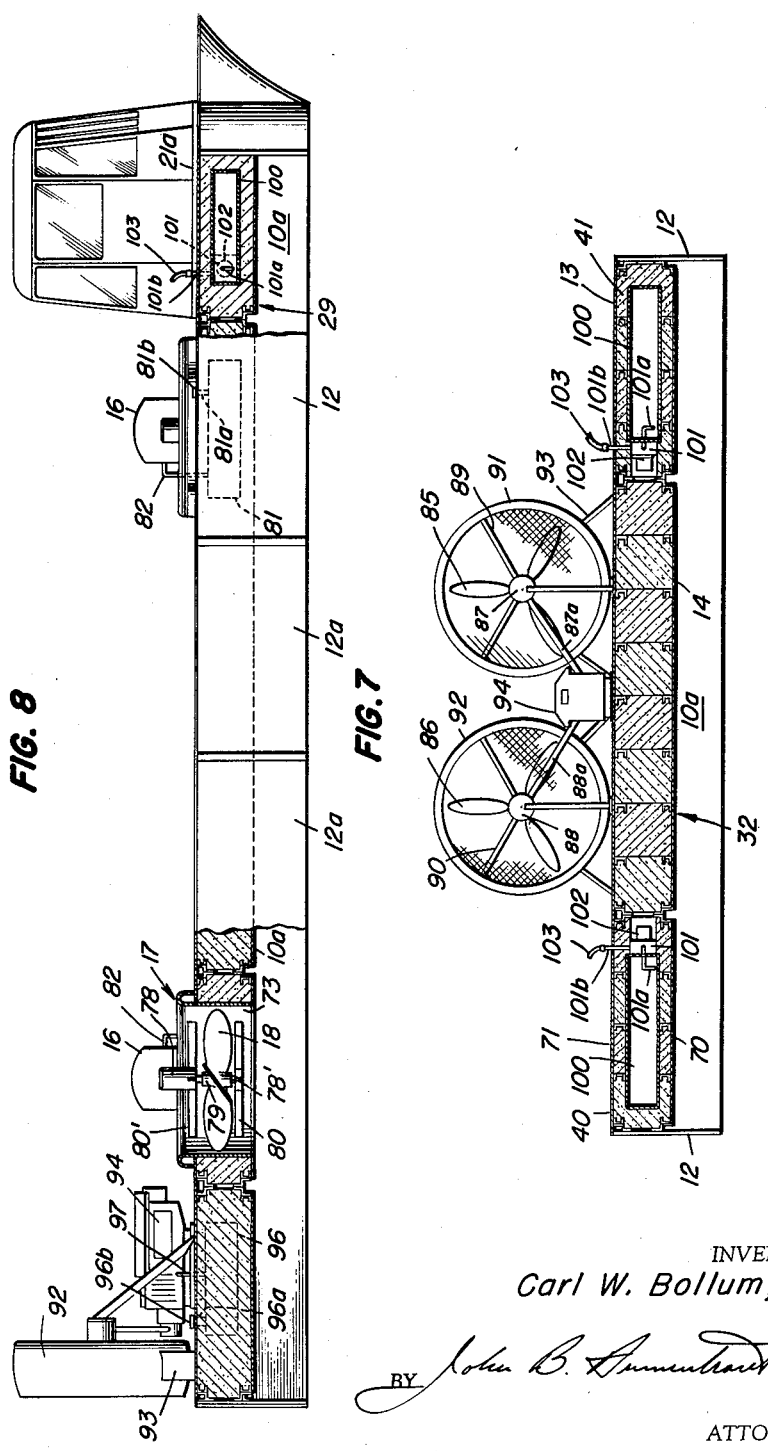

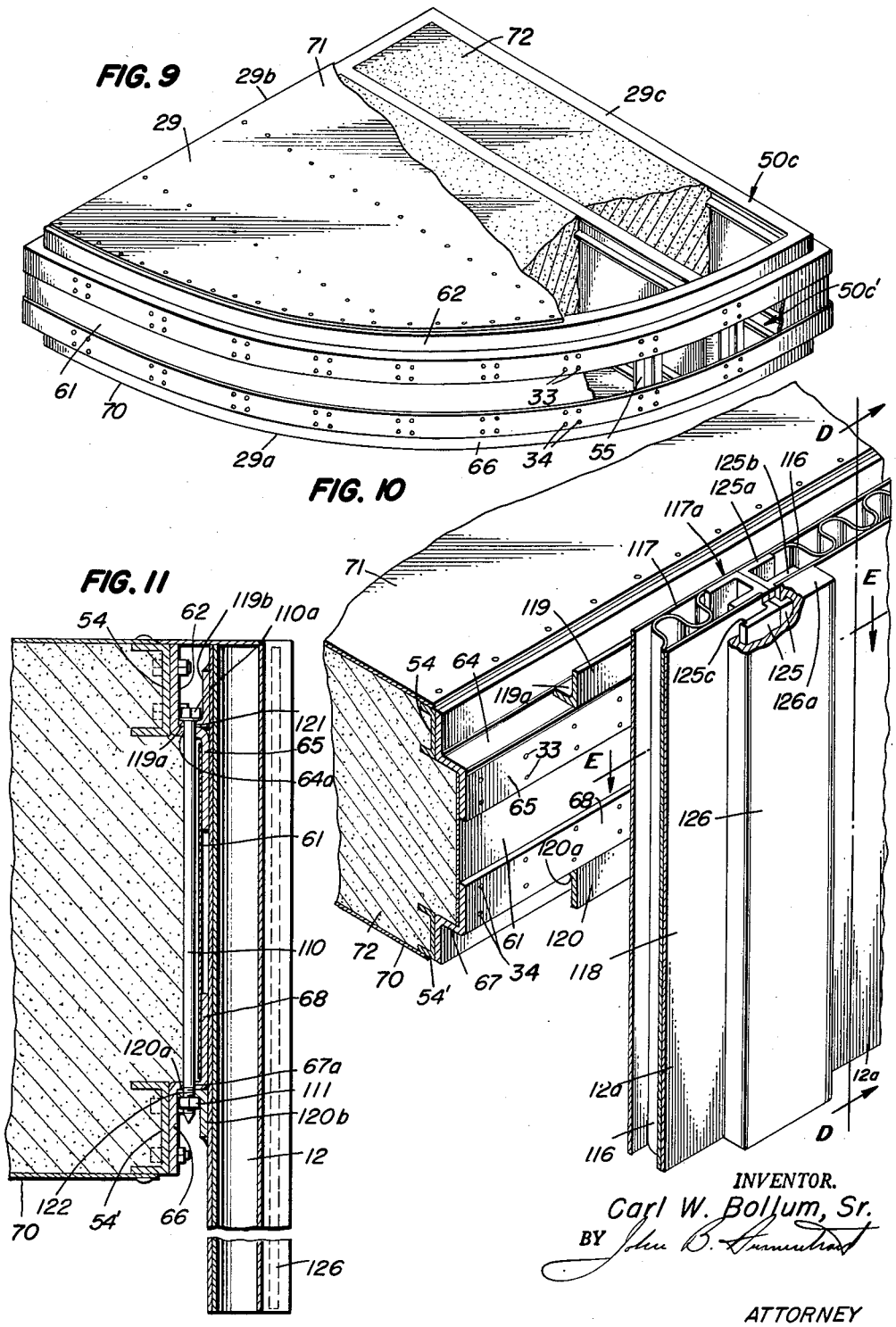

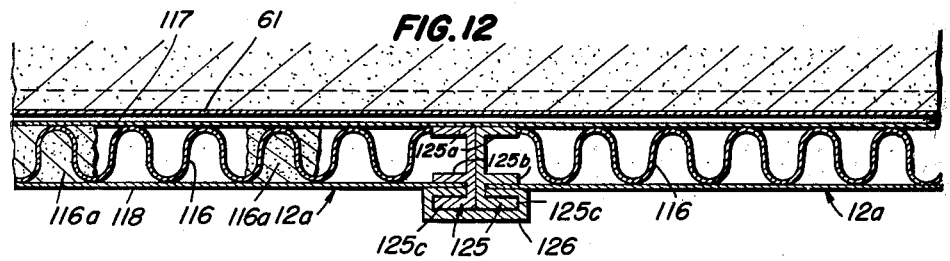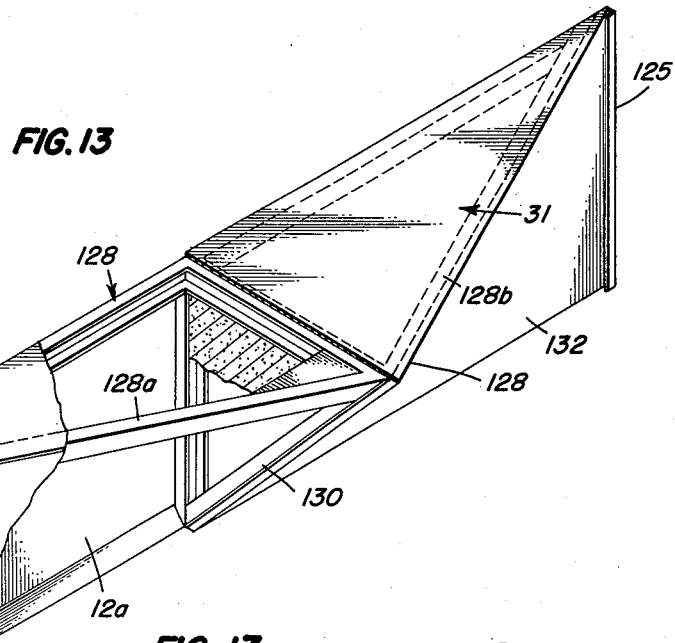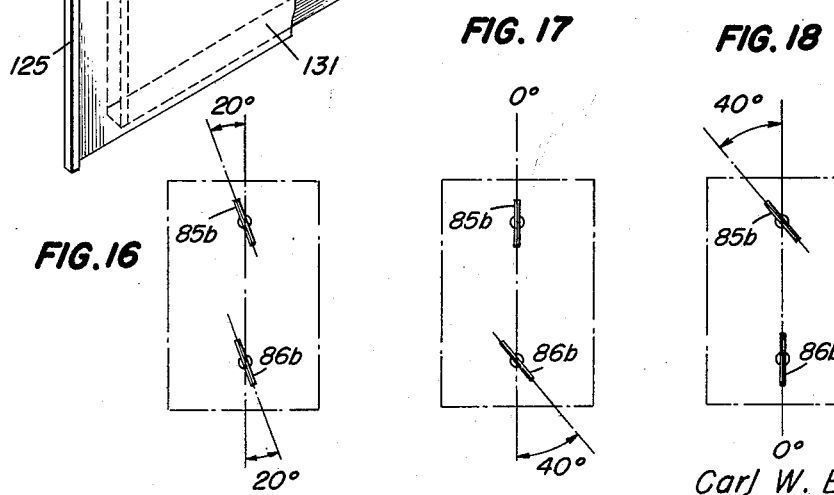

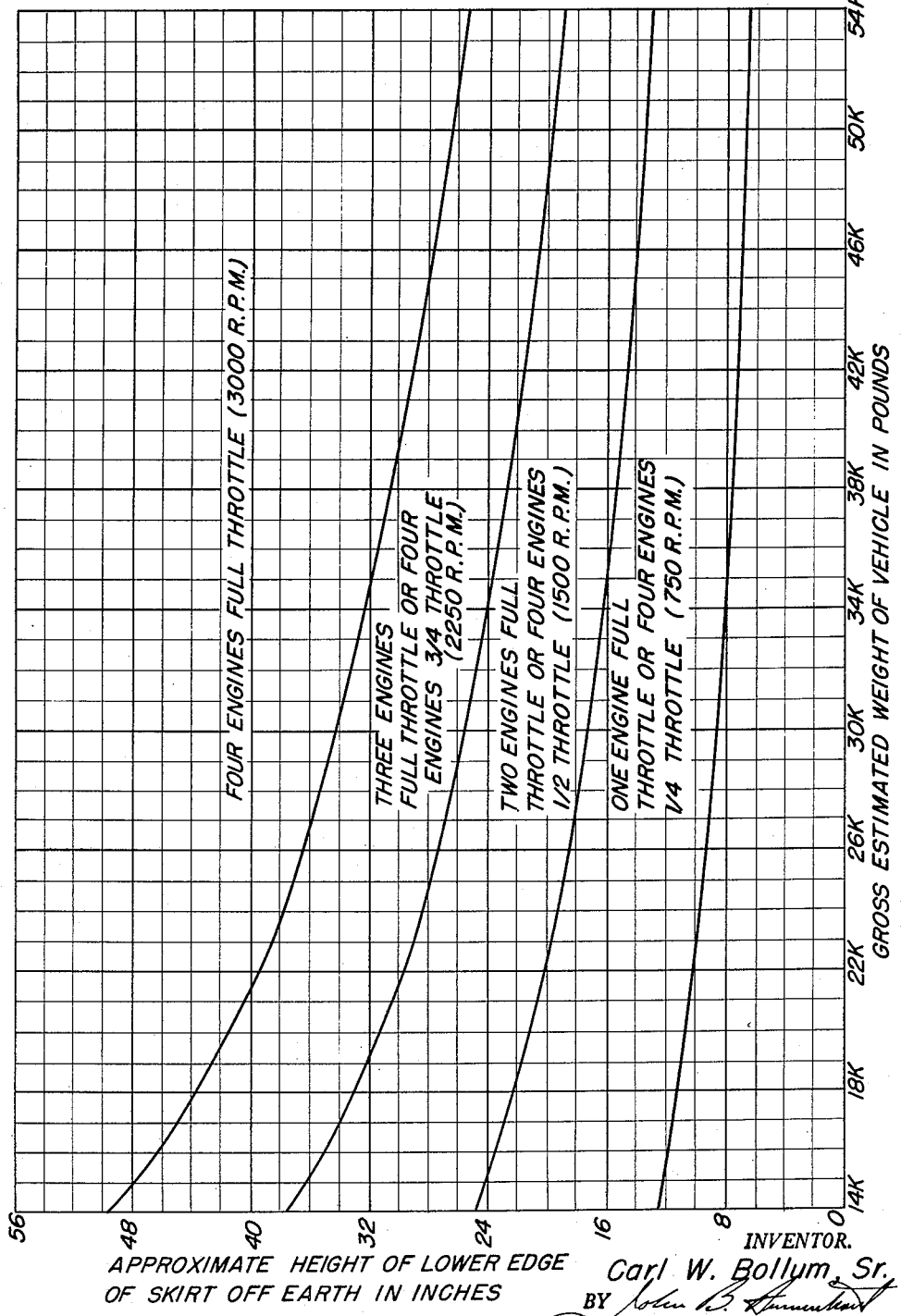

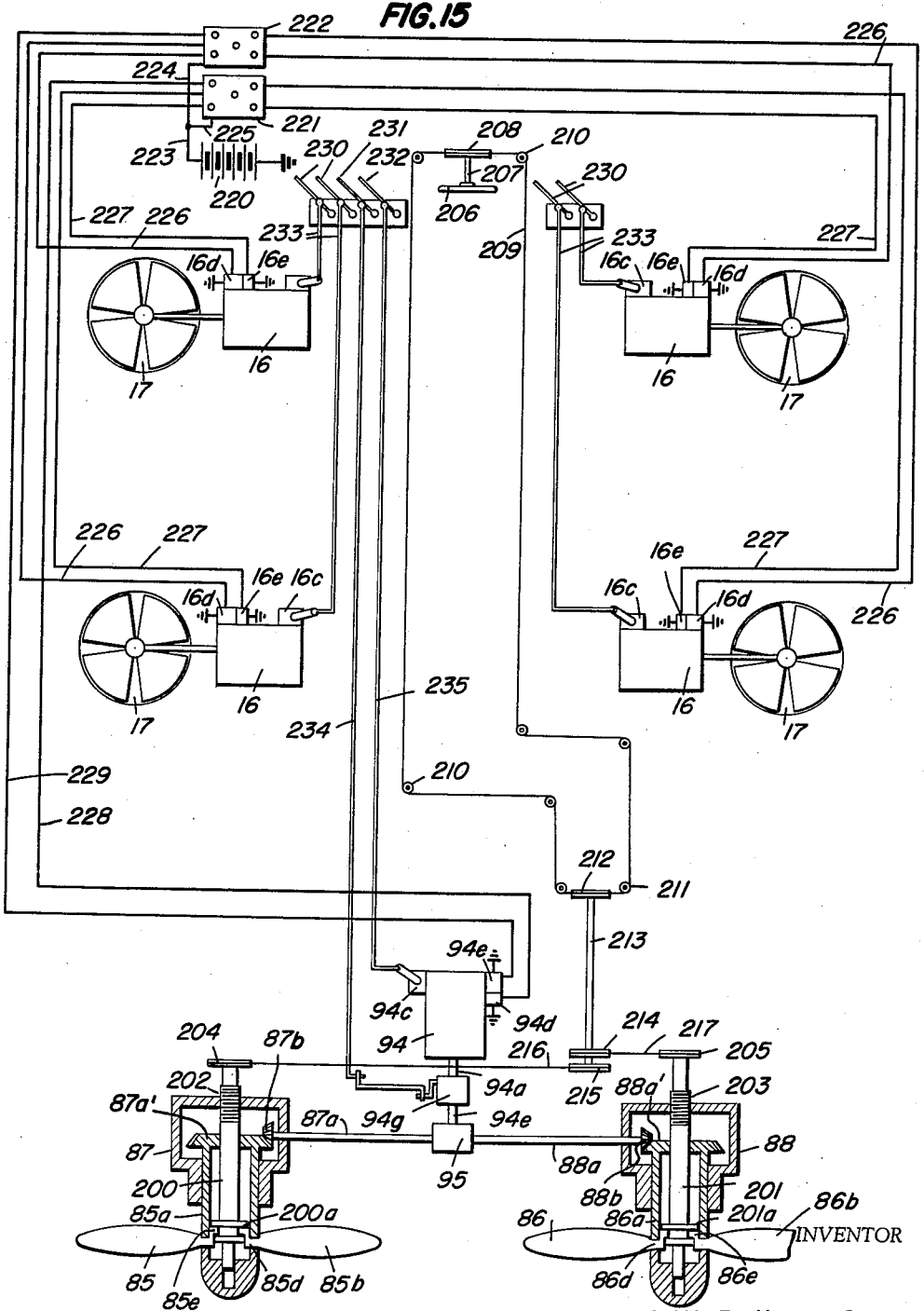

United States Patent Office 3,078,938
Patented Feb. 26, 1963

3,078,938
EARTH-SKIMMING AIR VEHICLE
Carl W. Bollum, Sr., Bethesda, Md., assignor, by mesne assignments, to Carwil Enterprises, Incorporated, Daytona Beach, Fla., a corporation of Florida
Filed Dec. 16, 1959, Ser. No. 859,908
8 Claims. (Cl. 180—7)

This invention relates to earth skimming air vehicles and more especially to vehicles which are adapted to be raised from a surface by gas pressure and travel airborne above that surface on the gas employed to produce the lift gap.

An object of the present invention is the provision of a skirted platform vehicle which is easy to construct and assemble and which is stably and powerfully gas pressure sustained within a range of low elevations above the surface of the earth on a blanket of gas producing the lifting pressure on the under side of the vehicle platform.

Another object of this invention is the provision of a vehicle of the character indicated having a large platform top area available for an occupant or occupants and other loads which are to be carried, a large platform bottom area on which the pressure of the lifting gas may effectively act to produce support and stability of the craft, and which vehicle includes platform and skirt sections contributing quite worthwhile structural features assuring ease of assembly of the vehicle such as when the several sections have been loaded and shipped to a destination where assembly is to be accomplished.

A further object is the provision of a gas pressure lifted and sustained vehicle in which the platform and skirt of the vehicle are each in several sections that are easily and securely assembled with each other by operations which are carried out by working from the top sides of the platform sections.

Another object of this invention is that of providing a strong and durable gas pressure sustained air platform vehicle in which the platform is highly buoyant when on water, thus enabling the vehicle to remain reliably afloat when in aquatic contact, which vehicle, with the aid of a skirt forming a plenum chamber having the under side of the platform for a ceiling, is capable of achieving lift and travel on a self-supplied blanket of gas serving as a separating barrier between the surface of the earth and the underneath side of the platform, and which vehicle while thus supported can travel gas pressure sustained from place to place along the surface of the earth.

Another object of this invention is that of providing a vehicle of the character indicated in which the vehicle platform reliably remains buoyant on water and the skirt includes sections which are effectively connected to the edge of the platform such as while the necessary work for establishing connection is performed from the top side of the platform.

Another object is the provision of a vehicle of the character indicated in which sections of the platform are individually buoyant on water and accordingly may be launched, oriented with respect to each other, and then connected together while the sections are afloat, the making of the connections being possible while working from the top sides of the sections.

Another object of the present invention is the provision of a platform vehicle in which prefabricated sections, including at least power lift section, of the platform are assembled and combined with power lift means which, in view of the size of platform produced and the maximum desired load rating of the vehicle, will deliver enough gas to the effective pressure lift area of the platform to render the vehicle gas pressure sustained in the air and able to carry loads up to a maximum load.

Another object of the present invention is the provision of a platform vehicle in which platform sections varying the size of the platform according to members employed introduce support for a predetermined number of gas feeding and compressing units which, in view of the size of platform produced and the maximum load rating of the vehicle, are needed to deliver gas under pressure to the effective pressure lift area of the platform and thus render the vehicle gas pressure sustained and able to carry loads up to a maximum load.

Other objects in part will be obvious and in part pointed out more fully hereinafter.

In the accompanying drawing forming a part of this specification, in which like characters of reference designate like components in the several views:

FIGURE 3 is a fragmentary vertical transverse sectional elevation of the vehicle platform along line A—A in FIGURE 2;

FIGURES 4 and 5 are perspective sectional views respectively of one of the supplemental area-increasing sections of the platform and of one of the power lift sections of the platform, the platform sections illustrated having portions of their coverings and fillings removed to expose inner structure;

FIGURES 4a and 5a are diagrammatic skeleton framework views respectively of one of the supplemental area-increasing platform sections and of the gas inlet end of one of the power lift sections;

FIGURE 6 is a detail view in perspective of one of the posts employed in the platform framework;

FIGURE 7 is a transverse vertical sectional elevation along line B—B in FIGURE 2 and representing certain aft portions of the vehicle in full elevation;

FIGURE 8 is a vertical elevation along the length of vehicle platform, partially in section in accordance with line C—C in FIGURE 2;

FIGURE 9 is a perspective view of one of the forward corner sections of the vehicle platform with the covering and filling of the section partially removed to expose inner structure;

FIGURE 10 is a perspective fragmentary view of structure including several longitudinal sections of the skirt, and the adjacent peripheral edge of the vehicle platform;

FIGURE 11 is a transverse vertical elevation along line D—D in FIGURE 10;

FIGURE 12 is a horizontal sectional view of the sections of the skirt on line E—E in FIGURE 10;

FIGURE 13 is a perspective partially broken away view of the bow section of the vehicle platform;

FIGURE 14 is a chart comparing different conditions of operation of a particular vehicle constructed in accordance with the present invention;

FIGURE 15 is a schematic representation of certain control and steering aspects in accordance with this invention; and FIGURES 16, 17, and 18 illustrate various relative positions of the thrust propellers of one of the vehicles.

In accordance with the practice of this invention, platform vehicles are provided having any of a variety of sizes and power lift ratings through assembling the platform frame from prefabricated sections and providing power lift means of sufficient capacity on the platform to lift the vehicle and the loads which may be carried by the vehicle into the air. A downwardly extending skirt supported by the platform defines a gas compression chamber wherein the ceiling of the chamber is the underneath side of the platform. The power lift means is adapted to deliver gas into the compression chamber and maintain that gas under pressure against the ceiling sufficient to raise the vehicle into the air and produce a lift gap between the skirt and the surface of the earth. A quantity of the gas continuously escapes through the gap into the ambient air outside the chamber and is continuously replaced by operation of the power lift means. Under a given set of working conditions the vehicle will seek a particular elevation where the amount of gas entering the compression chamber from the power lift means is equal to the amount of gas leaving the chamber through the gap, and is stable at this elevation by reason of the lifting effect of the pressure of the gas in the chamber.

The vehicles have propulsion and steering means for the vehicles to be propelled and steered while sustained in the air. When the craft are to be brought down, such as onto land or water, the rate of delivering gas into the compression chamber is diminished, such as by throttling down the power lift means, to reduce the volume of gas delivered under the platform to the point where the vehicles no longer remain in the air. Conversely the vehicles will raise themselves into the air when available power of the power lift means is exerted for that function.

Figure 1:
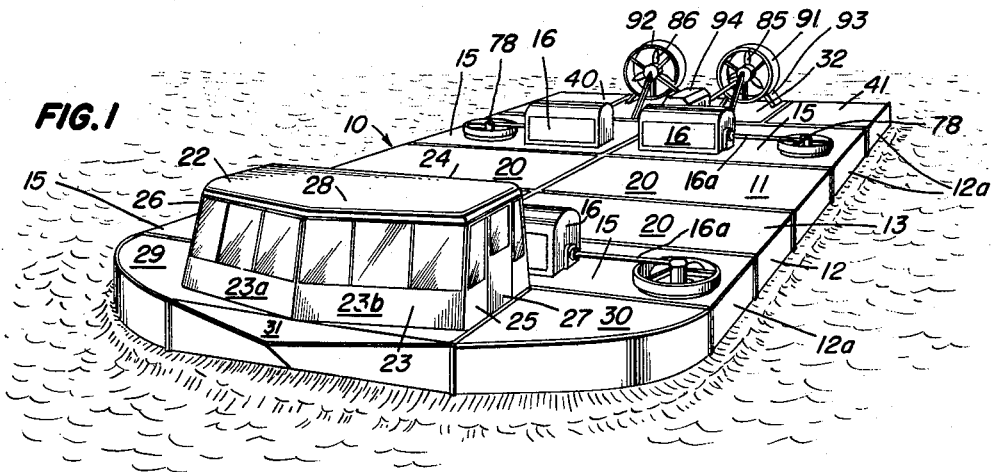
FIGURE 1 is a perspective view of a vehicle embodying my invention.
Figure 2:
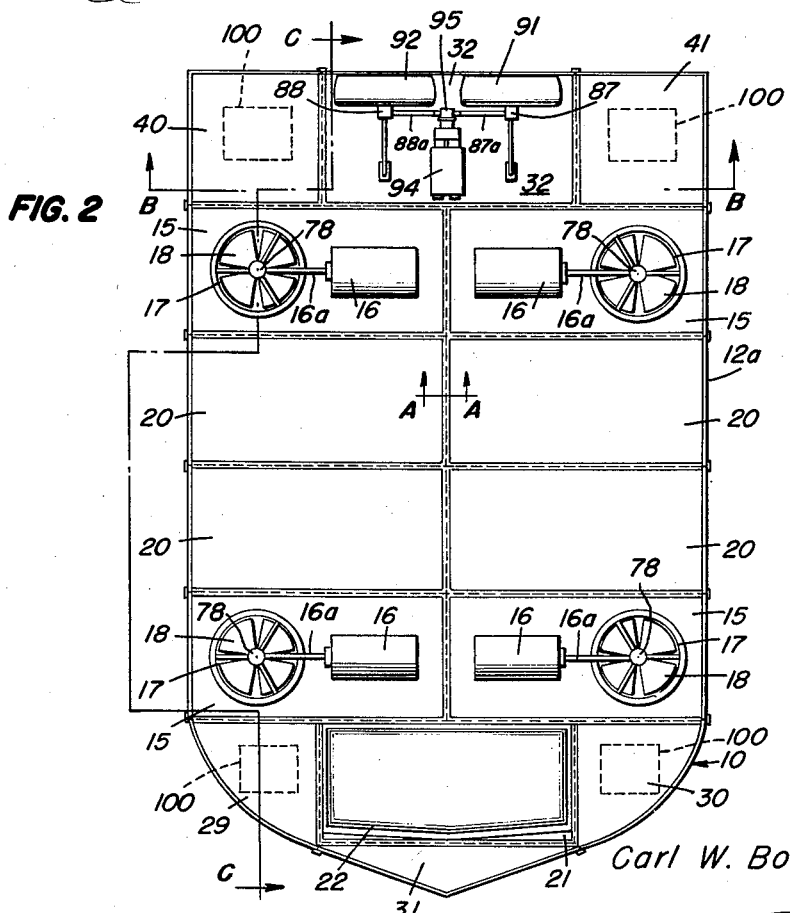
FIGURE 2 is a full plan view corresponding to FIGURE 1.

More specifically in accordance with the present invention, a hydro-air vehicle, designated generally by reference numeral 10 in FIGURES 1 and 2, includes a platform 11 having a skirt 12 extending around the perimeter of the platform. The platform has a deck surface 13 generally parallel to bottom surface 14 of the platform (see FIGURE 7) while the skirt extends substantially normal to both of these surfaces and for example projects below the bottom surface 14 a distance which is approximately equal to the thickness or height of the platform. Skirt 12 forms an air compression chamber 10a having bottom surface 14 of the platform for a ceiling and in the sense of a dam serves to impede the escape of gas from beneath the vehicle, accordingly converting kinetic energy of the gas into a well distributed static lifting pressure against the ceiling of the chamber.

A considerable advantage is had by constructing platform 11 from a plurality of prefabricated sections, each for example including a framework and a casing enclosing the framework, both made of a lightweight metal such as aluminum, and by interconnecting these sections to produce top deck surface areas and bottom gas pressure receiving surface areas of the vehicle. These sections in the present embodiment include four rectangular power lift platform sections 15 which have passages through the body from top side to bottom side for a gas such as air to be fed into the compression chamber 10a. Further, the platform 11 includes four generally rectangular supplemental platform area-increasing sections 20 which illustratively have the same outside dimensions as the power lift sections 15. Sections 20 are situated in pairs on opposite sides of the longitudinal center line of the vehicle and have their ends interconnected along that center line and along a line which is transverse to the center line. Two of the power lift platform sections 15 are situated forward of the supplemental platform area-increasing sections 20 and have adjacent ends interconnected at the longitudinal center line of the craft and aft edges interconnected to forward edges of the adjacent area-increasing sections. The other two power lift platform sections are disposed aft with respect to the sections 20 and have edges interconnected along the center line of the craft. Forward edges of the latter two power lift platform sections are respectively connected to aft edges of the adjacent area-increasing sections 20. Forward of the assembly of sections is a cabin platform section 21 of the vehicle, which section is rectangular in plan and conveniently is of the same outside dimensions as the sections 15 and 20. The cabin platform section has its aft edge connected to the forward edge of the adjacent power lift platform sections and is disposed generally symmetrically with respect to those sections as to be substantially bisected by the longitudinal center line of the craft. Erected on the cabin platform section and over the platform area afforded by that section is a housing 22 which affords the cabin proper, which for example may mainly be of aluminum. The housing includes a front wall 23, a back wall 24, and opposite side walls 25 and 26. The front or forward wall is in two principal sections 23a and 23b which are angularly disposed with respect to each other, forming an apex at about the longitudinal center line of the craft and extending backward toward the opposite sides of the platform 11. The front wall has windows to afford forward view from inside the cabin. An access door 27 is provided in side wall 25 and if desired the side walls and rear walls may be glazed for view and light. A top deck or roof 28 is supported by the several walls to cover the cabin area.

Platform 11 also includes two forward corner sections 29 and 30 connected to the forward edges of the adjacent power lift sections 15 and having edges interconnected to the opposite side edges of the cabin platform section. The corner sections are right hand and left hand counterparts and have like dimensions so as to produce a symmetrical platform 11. Corner sections 29 and 30 are generally triangular in plan and are of a size which establishes outer peripheral edge continuity of the platform from the outer peripheral edges of the power lift platform section to the forward edge of the cabin section.

At the aft end of the vehicle is a rectangular propulsion platform section 32 having outside dimensions which conveniently are the same as the outside dimensions of the power lift platform sections 15, the supplemental platform area-increasing sections 20, and the cabin platform section 21. The propulsion section has its forward edge abutting the aft edges of the adjacent power lift platform sections and is interconnected with these sections in a position where the longitudinal center line of the craft substantially bisects the propulsion section.

Substantially rectangular corner platform sections 40 and 41 form portions of the platform 11 at the aft end of the vehicle. These corner sections are as wide and half as long as the propulsion platform section 32 and have forward edges connected to corresponding aft edges of the adjacent power lift platform sections 15 and inside edges connected to opposite end edges of the propulsion platform section 32. In all, the platform 11 therefore is generally rectangular in plan. As will be explained more fully hereinafter, edges of the various sections which occur outside the platform on the perimeter of the platform conveniently allow lengths or sections 12a of the skirt 12 and of full skirt height to be attached to the platform. Sometimes, certain of the platform sections have their corresponding lengths of the skirt 12 prefabricated and attached to a given platform section prior to the time that the platform of the vehicle is assembled from the various sections employed. Thus, for example, all of the corner sections 29, 30, 40, and 41 of the platform are prefabricated as independent sections which already include lengths of the skirt along the sides or edges of those sections which are to occur outside the platform 11. Then after assembling all of the sections of the platform in their proper relations, remaining lengths of the skirt are added by attachment to the outside edges of the power lift sections 15, supplemental area-increasing platform sections 20, cabin section 21, and propulsion section 32.

Each of the supplemental platform area-increasing sections 20 (see FIGURES 3, 4 and 4a) is characterized by having a rectangular top frame portion 50 and a rectangular bottom frame portion 50' of like outside dimensions. The top frame portion includes a pair of opposite parallel longitudinal channel members 53 (see FIGURE 4) and an opposite pair of transverse channel members 54 (see FIGURE 3) joining like ends of the longitudinal members while the bottom frame portion 50' includes a pair of opposite parallel longitudinal members 53' joined at like ends by the transverse channel members 54'. The ends of the channel members of each rectangular frame portion 50 and 50' are suitably fitted and welded together at the corners of that frame portion and the flanges of the channel members 53, 54, 53' and 54' are generally horizontal and are directed toward the inside of the platform section, as will be noted in FIGURES 3 and 4. Supporting the bottom flanges of the channel members of the upper frame portion from the top flanges of the channel member of the bottom frame portion are a plurality of vertical posts 55 laterally spaced (FIGURE 4a) from each other at suitable distances around the perimeter of the platform section 20. These posts (see FIGURE 6) include angle members 56 and 57 at their opposite ends, which angle members have horizontal legs 56a and 57a bearing against the flanges of the corresponding channel members of the top and bottom frames 50 and 50' while vertical legs 56b and 57b of the angle members are attached as by welding respectively to top and bottom ends of strut plates 58 and 59 of the post which lie along opposite sides of the edges of the vertical legs of the angle members. The outside surfaces of the strut plates and vertical legs of the angle members lie in a vertical plane which is substantially parallel to a plane which includes the vertical webs of the corresponding longitudinal or transverse channel members of the upper and lower rectangular frame portions 50 and 50' of the platform section, depending upon whether the posts are situated along transverse or longitudinal channel members of those frames. Each of the posts 55 includes a vertical channel member 60 extending the whole distance between the upper and lower horizontal legs 56a and 57a of the angle members of the post, and the vertical channel member opens toward the outside of the platform section and affords legs 60a and 60b which are welded to the inside surfaces of the strut plates 58 and 59. Accordingly, the vertical channel member closes off the space that is inside the platform section 20 from the outside of the section. A strip of thin gauge sheet metal 61 (see for example FIGURE 3) covers a space existing between the vertical legs 56b and 57b of the angle members of each of the posts 55 in the platform section and extends the full perimeter of the platform section. A top rail 62 made of heavy gauge sheet metal encloses the perimeter of the rectangular top frame portion 50 of the platform section and is secured to the webs of the channel members of the top frame portion such as by bolts 63 at suitable intervals around the perimeter. The top rail has a reverse angle extension which affords a top ledge 64 and a vertical rim 65 both extending the full perimeter of the platform section. Rim 65 is secured to the posts 55 as by means of rivets 33. The ledge 64 of the top rail conveniently rests on the upper surface of the horizontal leg 56a of angle member 56 in each of the posts. Similarly, the platform section 20 includes a bottom rail 66 formed of heavy gauge sheet metal and the bottom rail has a reverse angle extension forming a bottom ledge 67 resting against the under surface of leg 57a in each of the vertical posts in the assembly and affording a lower rim 68 riveted at 34 to each of the posts 55. Upper and lower rims 65 and 68 overlap the thin gauge metal cover strip 61 continuously around the perimeter of the platform section and the riveting of the rims to the posts also accomplishes affixation of the cover strip thus closing off the interior of the platform section and completing the peripheral side wall of the section 20.

The lower rectangular frame portion 50' of the platform section is covered bottom side of the section by metal sheet 70 of suitable gauge which is riveted at intervals or otherwise suitably affixed to the lower legs of the longitudinal and transverse channel members 53' and 54' of the lower rectangular frame. For additional support and strengthening of the platform section, a set of spaced parallel channel beams 50a' (see FIGURES 4 and 4a) are conveniently introduced and connected to opposite channel members 53' of the lower rectangular frame portion. Struts 50b' sometimes are added between beams 50a' and running the distance between the other pair of channel members 54' forming the lower rectangular frame portion. Bottom cover sheet 70 conveniently is further secured as by riveting to the inner frame portions 50a' and 50b' of the lower rectangular frame portion.

The deck surface of platform section 20 conveniently is provided by a sheet metal covering 71 affixed to the top rectangular frame portion 50 of the section. The sheet metal deck usually is made of a somewhat heavier gauge material than is the covering 70 on the under side of the platform section especially when direct deck use is to be encountered. The deck sheet may further be supported by a series of spaced channel members 50a extending between and interconnected with corresponding opposite outside channel members of the top rectangular portion of the frame. These inner channel members of the frame may have lateral struts 50b extending between themselves and the other pair of opposite outside members of the top rectangular portion of the frame. Partition sheets 69 having widths approximately equal to the thickness of the platform section 20 preferably are interposed between members 50a and 50a' and between members 50b and 50b' and are connected to these members to produce reinforcement and a lattice-work of cells 69a on the inside of the platform section. The deck covering 71 usually is affixed to the inside channel members 50a and struts 50b referred to. Prior to closing off the inside of the platform section 20, such as before putting the coverings 70 and 71 in place, a very substantial advantage is had by filling the available space inside the section with a substance which will assure buoyancy of the section in the water and in effect substantially eliminate space which otherwise could through leaks receive appreciable amounts of water in the platform section, with the water unduly adding to the vehicle load when the vehicle is airborne or is to rise from the earth in accordance with the available air lift capabilities. A preferred manner of assuring buoyancy and water repellance and the retention of those properties resides in filling the available cell space 69a of the platform section with a low density, water-repellent material 72 in the form of a solid having closed voids for excluding water from the inside of the section by maintaining a closed cellular watertight condition in the presence of water accordingly to displace an equal volume of water. This filling which for example is a lightweight resin foam, such as Styrofoam, often is introduced in the majority in cake or batt form roughly to fill the available space in the platform section. Rectangular sheets or cakes of the foam illustratively are placed side by side in the space for this purpose while any remaining spaces between the foam cakes introduced and the side surfaces of the platform section are filled by foaming further amounts of the same resin or a compatible resin in situ which for example integrally bonds the cakes to the inside surfaces of the cell walls of the platform section. The section 20 preferably is filled with the low density material level with the outermost surfaces of the frame members of the upper and lower frame portions and then the cover sheets 70 and 71 are put into place preferably by being cemented or otherwise integrally bonded to the low density filling and by being riveted to the corresponding upper and lower frame portions. The integral bonding contributes strength to the platform section and further eliminates space for water to enter.

The cabin platform section 21, propulsion section 31, and each of the lift air inlet platform sections 15 of the vehicle also include top and bottom rectangular frame portions 50 and 50', vertical posts 55 between these frame portions, and structure including a thin gauge metal strip 61 and top bottom rails 62 and 66 with reverse angle extensions riveted to the post through the sheet metal strip, and cells 69a inside. This structure has already been described with reference to the supplemental area-increasing platform sections 20 and accordingly will not be repeated in full detail. The inside framework of each of the power lift platform sections (see FIGURES 5 and 5a) is modified to include top and bottom annular plates 75 and 76 in the top and bottom inner frame work of the section. In the present embodiment a cylindrical air duct 73 of very considerable diameter extends through the body of platform section 15 and through the openings afforded by the annular plates 75 and 76 in the top and bottom inner framework. Struts 77 are situated immediately outside the duct wall surface that is exposed to the interior of the platform section. The struts 77 and annular plates 75 and 76 are suitably secured to each other at the upper and lower ends of the struts and if desired the wall of the duct is connected to the struts such as by riveting. For additional support and strengthening of the platform section, a set of parallel channel beams 50a are conveniently introduced and connected to opposite channel members 53 of the upper rectangular frame portion 50. Certain of these channel members are interrupted along their lengths and are suitably connected to the rim of top annular plate 75. Lateral struts 50b conveniently are added between the beams 50a and extending the distance between the other pair of channel members forming the upper rectangular frame member 50. Some of these struts 50b have their ends connected to the periphery of top annular plate 75. Likewise, lower rectangular frame portion 50' of the platform section includes inner channel members 50a' and lateral struts 50b' assembled therewith and with the bottom annular plate 76. Partition sheets 69 preferably are supported by members 50a and 50a' and 50b and 50b' to produce reinforcement and a lattice-work of cells 69a inside the section. A bottom cover sheet 70 extends over the bottom frame structure of the platform section and is secured to that structure as by riveting and also a top cover sheet 71 extends over the top framework of the section and is secured in place as by riveting to the allied frame structure. The upper end of the cylindrical duct 73 has an outwardly arched rim 73a including an outside return leg 73b for trim. At the lower end, cylindrical duct 73 conveniently abuts the inside surface of bottom cover sheet 70 and is suitably secured to that sheet as by welding.

In accordance with the present embodiment power lift means, including an air lift pump 17 (see especially FIGURE 8) having a four blade rotor 18 with the blades pitched in favor of delivering air from the deck side of the power lift platform section to the bottom or air pressure lift side of the section, has its shaft 79 journaled in bottom bearing 78' which is supported by radial arms 80' and extending to the wall of the duct 73 and connected through the wall as to the vertical struts 77. Pump shaft 79 is the output shaft of a right angle gear box 78 mounted to upper radial arms which also are suitably connected to the frame of section 15. The input side of gear box 78 is powered by means of substantially horizontal drive shaft 16a (see FIGURES 1 and 2) driven by motor 16 which illustratively is of internal combustion engine type and has a base, preferably resting on the deck surface of the platform section 15. The motor conveniently is connected to the underlying top members of the frame of the section by means not shown.

In the space available inside power lift platform section 15 advantageously is a fuel tank 81 (see FIGURE 8) suitably mounted to the inner framework of the section and having a fill tube 81a extending through the deck sheet 71 and covered by means of a screw cap 81b. Further, the fuel tank and motor 16 have an interconnecting fuel supply line 82 so that fuel in the tank is available to the fuel pump of the motor for the motor to operate under control of an ignition 16e, a starter 16d and a throttle 16c as will be noted in FIGURE 15. All remaining space inside power lift platform section 15 preferably is filled with a low density, water-repellent filling in the manner previously explained with reference to the supplemental area-increasing platform sections 20.

Propulsion section 32 of the platform 11 of the vehicle conveniently is structurally the same as each of the supplemental area-increasing sections 20 of the platform except that (see FIGURES 1 and 7) the propulsion section ultimately accommodates propulsion equipment of the vehicle. This equipment includes thrust-producing propellers 85 and 86 having substantially horizontal shafts 85a and 86a, shown in FIGURE 15. These shafts are connected to input shafts 87a and 88a of L-gear boxes 87 and 88 respectively. The gear boxes are mounted on spider frames 89 and 90 (see FIGURE 7) which are forward of the propellers and attach to annular shroud frames 91 and 92 surrounding the respective propellers. The shroud frames of the propellers are connected to the inner framework of the propulsion section such as by a suitable frame 93 attached to the shroud rings and to the framework of the platform section 32. The propellers have a driving motor 94 anchored to the platform 11, such as to the framework of the propulsion section 32 itself by any suitable means not shown. This motor has its drive shaft 94a (FIGURE 15) situated in the fore and aft direction of the vehicle and the drive shaft is operative through clutch 94g and a T-gear box 95, the latter including input shaft 94e and twin output shafts 87a and 88a which are the input sides of the L-gear boxes 87 and 88. The gearing arrangement employed may for example be of the type to cause both propellers to rotate simultaneously in like directions or of the type which cause the propellers to operate simultaneously in opposed directions. A fuel tank 96 (FIGURE 8) conveniently occupies part of the space within the body of the propulsion section and is equipped with a fill tube 96a having a closure cap 96b above the surface of the deck. A fuel line 97 interconnects the fuel tank and the motor so that the fuel pump of the motor can supply fuel for the vehicle to operate under control of a throttle 94c, a starter 94d and ignition 94e as shown in FIGURE 15. The remaining volume of the interior of the propulsion section advantageously is divided into cells 69a and filled with low density, water repellent material in the manner previously explained with reference to others of the sections of the platform.

The cabin platform section 21 is adapted to accommodate the erection of the cabin walls such as by having suitable cabin wall attachment plates 21a (see FIGURE 8) covering the deck surface of the section and suitably connected to the framework of the section through the deck. Structural details of the cabin platform section are otherwise conveniently the same as that of one of the supplemental area-increasing sections 20. The space inside of the cabin platform section advantageously is divided into cells 69a and is filled with the low density, water repellent material in the manner hereinbefore mentioned with reference to others of the sections of the platform to lend strength, and to assure buoyancy of the section when the vehicle is afloat on water.

An understanding of the structure of corner sections 29 and 30 of the platform will be made clear through describing section 29, since the sections are righthand and lefthand counterparts. Referring to corner section 29 and more particularly to FIGURE 9, forward side 29a is a curved wall and the other two sides 29b and 29c are planar and perpendicular to each other. The section conveniently includes top and bottom triangular frame portions 50c and 50c'. The top and bottom triangular frame portions are made up of channel members having their webs vertical and the legs extending toward the inside of the corner section. Suitable top and bottom inner frame elements conveniently are added to the triangluar frame components to contribute strength. The side frame and walls of the generally triangular corner section 29, other than contributing to the generally triangular configuration of the section, are like the side frame and walls of rectangular platform section 20 or of any of the other rectangular sections of the platform. Vertical posts 55 are interposed between the top and bottom triangular frame portions 50c and 50c′ and are laterally spaced from each other, receiving on the outside a cover strip of thin gauge sheet metal 61 which is overlapped by reverse angle extensions of top and bottom rail members 62 and 66, the latter being fastened to the webs of the channel members of the top and bottom triangular frame portions. Rivets secure the reverse angle extensions and thin gauge metal strip to the posts 55. Bottom and deck sheets 70 and 71 are carried suitably attached to the lower and upper frame portions 50c and 50c′ of the corner section.

As for the aft corner sections 40 and 41 of the platform of the vehicle, these conveniently are rectangular (see FIGURES 7 and 8) and have framework and walls which are similar to that described with reference to the supplemental area-increasing sections 20 of the platform. This structure therefore includes top and bottom rectangular frame portions, posts, top and bottom rail members with reverse angle extensions covering a thin gauge sheet metal strip. Bottom and deck sheets 70 and 71 are secured to the rectangular frame portions as already described with reference to others of the sections of the platform. Each of the corner sections 29, 30, 40, and 41 of the vehicle, in the space inside, advantageously includes a ballast tank 100 mounted to the framework of the section and a two-way reversible pump 101 supported on the oustide wall of the tank along with a reversible driving motor 102 for the pump. Pump 101 has one of its sides 101a connected into the ballast tank and a line 101b from the other of its sides extends to the top deck wall of the corner section and is connected on deck to a hose 103. Water may be pumped into ballast tank 100 of each corner section by operating the related pump 101 under one direction of drive of its motor thus drawing water through hose 103 from overboard. Ballast water is drawn off from the corner sections by reversing the motor-pump unit. The ballast pump driving motor 102 in the instance of each of the corner sections conveniently is remotely controlled with the air of an individually corresponding control circuit and the circuit for example includes a reversing start-stop switch (not shown) for the related motor 102 to give control over ballast in the one corner section while other circuits and their included reversing switches are provided for singly controlling the ballast motor-pump units in the other corner sections of the platform thus to adjust the ballast load at each of the corners.

The ballast tanks and their pumps in the four corner platform sections of the vehicle accordingly are employed for trimming or leveling the craft, such as where load of cargo on the platform 11 is asymmetrical. The corner sections of the platform, whether made with or without ballast tanks inside, usually are filled with foam resin or the like. With ballast tanks present, the filling would be in any available space between the tanks and the walls of the section. Of course when the tanks are empty of water they contribute worthwhile buoyancy to the vehicle platform.

The various sections of the platform 11 heretofore described may be readily assembled to produce a rigid platform structure and in this regard attention now is directed to the upper and lower ledges 64 and 67 (see for example FIGURE 3) amounting to peripheral extensions of the main top and bottom surface areas of the individual sections. These ledges have a series of apertures 64a and 67a along their lengths and the apertures are vertically aligned through the space afforded in each of the posts 55 of the frame structure. For this purpose the posts 55 each have top and bottom openings 56c and 57c respectively through the horizontal legs of the angle members 56 and 57. The spaces inside the posts occur by reason of the vertical channel components 60 of the posts which set apart the hollow post space such as from the foam resin filling of the platform section when the filling is introduced to assure buoyancy. Top and bottom connecting plates 112 and 113 each have two spaced parallel series of holes 112a and 113a and the holes in the series correspond to the apertures 64a and 67a in the ledges of adjacent platform sections. First, the top and bottom plates 112 and 113 are connected to the top and bottom ledges 64 and 67 of a given one of the platform sections through the use of bolts 110 having pointed ends 110b and corresponding nuts 111. In accomplishing this, the shank of each bolt is inserted through a corresponding set of aligned apertures 112a, 56c, 113a and 57c on the side of the one platform section. The top and bottom plates then form projections between which the top and bottom ledges of the adjacent platform section are received. In assembly the two platform sections, therefore, side walls of the sections are brought into abutment, and the second section of the two then is fastened in place by the insertion of bolts 110 through the remaining other series of apertures in the top and bottom connecting plates 112 and 113 with the bolts extending through corresponding sets of the aligned openings 112a, 56c, 113a, and 57c and the spaces afforded inside the posts 55 of the second section. A very considerable advantage is had by employing captive nuts 111 or other threaded portions axially and rotatively constrained to receive the threads of the bolts at the under sides of the platform sections. The lower connecting plate 113 may for example have the various nuts 111 welded to the under face of the plate in proper alignment with the holes 113a in that plate. It will therefore be seen that the several sections of the platform may be interconnected by the use of top and bottom plates while the work is performed from the deck or top side of the platform. This feature avoids handling and hoisting of the sections to gain access to the underneath sides to complete the connections needed for uniting the sections. Further, this connection feature is quite valuable when buoyant platform sections are employed for making the platform. The sections may be assembled while the sections or sub-assemblies of the sections are afloat on water. It will be noted that in the present embodiment spaces or troughs 114 occur between the deck levels of several sections of the platform by reason of the ledge detail. By covering these troughs with deck strips 115 and fastening these strips in place to the upper frame portions 50 of the platform sections, a platform having a continuous deck including top sheets 71 of the sections and strips 115 is achieved. The trough space often is utilized for housing pipes, cables, control wires or the like, such as circuit wires between manipulative control devices in the cabin and pitch varying means drivingly connected with the blades of the propulsion propellers, where pitch variation of the propellers is relied upon for steering the craft, and in way of further illustration trough space in the platform may house control cables and linkages from manipulative instruments in the cabin for remotely controlling speeds of operation of the drive means employed for the lift air pumps and the propulsion propellers. Inverted troughs 116 incidentally occur in the present embodiment on the underneath sides of the adjacent platform sections by reason of the bottom ledges of the platform sections. However, it is not important that the inverted troughs be covered. The main ceiling area of the compression chamber 10a is constituted of the bottom cover sheets 70 of the platform sections in the assembly, and the inverted troughs between the sections also contribute air pressure lift area for the ceiling.

Skirt 12 of the platform 11 advantageously is a laminated sheet metal structure (see FIGURE 12) in which an intermediate layer 116 of the skirt is of corrugated sheet metal having ribs extending vertically in the position of use of the skirt on the vehicle. This corrugated intermediate layer is between two outside sheet metal layers 117 and 118 suitably bonded to the intermediate layer at the crests of the ribs of the intermediate layer. Sometimes the laminated body of the skirt is constructed having the intermediate layer 116 embedded in a resin 116a which fills the spaces between that layer and the outer layers 117 and 118 and bonds the outer layers in place in the composite. On one face 117a of the composite sheet and generally parallel to the top edge of that sheet are spaced upper and lower skirt connector components (FIGURE 10) 119 and 120 such as in the form of upper and lower rail members extending along the length of the composite sheet. The upper and lower rail members conveniently are angle members having legs 119a and 120a perpendicular to the surface of the composite sheet and legs 119b and 120b resting against the surface of the sheet and connected to the laminated body as by rivets at suitable intervals. The outwardly projecting legs 119a and 120a of the angle members are spaced apart a distance which is just slightly more than the distance of spacing of the upper and lower ledges 64 and 67 heretofore described with reference to the platform sections of the vehicle. There are apertures 121 and 122 through the legs 119a and 120a of the angle members and the apertures are in vertical alignment and occur at intervals which are equivalent to the spacing of bolt holes 64a and 67a in the upper and lower ledges of the platform sections. The skirt 12 accordingly is secured to the side walls of the platform sections that are exposed at the periphery of the platform after the sections have been assembled. Connection of the skirt is accomplished by using bolts 110 (see FIGURE 11) which are inserted through the apertures 121 and 122 in the skirt angle members 119 and 120 and through apertures 64a and 67a in ledges 64 and 67 of the side walls of the platform sections after applying the skirt so that the legs 119 and 120 of the angle members receive the ledges 64 and 67 in a tongue and groove fashion. Leg 120 of the lower angle member of the skirt advantageously has axially and rotatively constrained threaded portions, such as nuts 111 welded or brazed to the underneath side of the angle member leg, to receive the threaded shank ends of the bolts. The latter arrangement permits the bolts 110 to be inserted in the fastening positions and thereafter be tightened by rotation by force applied to the bolt heads 110a to secure the assembly while working from above such as from the surface of the platform of the vehicle.

Skirt 12 preferably is prefabricated in sections 12a lengthwise in terms of total length of the skirt. These lengths conveniently are made primarily of aluminum and are equivalent in length to the dimensions of the platform sections which contribute to periphery of the platform. The ends of the skirt lengths or sections which are to be vertical in the assembly illustratively are built to include E-shaped edge forming components 125 (see FIGURE 12) and each edge forming component has two of its legs 125a and 125b inserted between the outside sheet members 117 and 118 of the laminate and suitably secured to these sheets such as by welding. An outermost leg 125c of the E-member is outside the sheet 118 and is generally parallel to the outside surface of the section 12a. By installing the sections 12a of skirt 12 so constructed, the E-members at the edges of the skirt lengths are brought into back to back abutment and the outside legs 125c of the adjoining lengths of the skirt accommodate a C-rib 126 which for example is moved down vertically while working from the deck of the platform so as to engage the outer legs of the E-members and hold the adjoining lengths 12a of the skirt together along their full heights. A suitable stop 126a may be provided on the upper end of the C-member to arrest vertical movement when the member has been slid in place along the full height of the skirt. The skirt assembling operations described may proceed all the way around the perimeter of the platform until the skirt 12 has been affixed to the outside wall of the platform 11.

A bow section 31 (see FIGURE 13) conveniently is provided to lend contour to the front of the vehicle 10. This bow section in the present embodiment is derived through prefabricating one of the lengths 12a of the vehicle skirt to form the section. Thus, a skirt length 12a, including E-shaped vertical edge forming components 125, supports adjacent to the top edge a triangular top frame 128 carrying a cover plate 129 that provides an extension of the deck of the vehicular platform. The forward members 128a and 128b of the triangular top frame of the bow section come to a forward apex which is substantially on the longitudinal center line of the vehicle. Secured to these forward members at the apex is an inclined strut 130 having its lower end suitably connected to the skirt section 12a near the lower edge of the section centrally along the length of the section. Bow plates 131 and 132 are connected to the marginal portions of the opposite ends and bottom of the skirt section and also are connected to the corresponding forward members of the triangular frame of the section as well as to the inclined strut of the section. Space within the bow section 31 advantageously is filled with foamed resin to exclude water.

When the bow section 31 is assembled to the forward edge of the cabin section 21, such as in the manner of assembling the other skirt sections to the platform, a bow is had which involves the use of a skirt section extending directly along the forward edge of the cabin platform section. C-rib connectors 126 conveniently are utilized to engage the E-shaped edge forming components of the skirt length 12a in the bow section to the adjacent E-shaped edge forming components of the skirt lengths corresponding to the platform corner sections 29 and 30.

In certain instances in the practice of this invention, platform sections are built already having lengths of the skirt attached before the sections of the platform are assembled to produce the platform. For example, the several corner platform sections of the vehicle are initially constructed with integral skirt portions along the lengths of the platform sections which ultimately are to occur in the periphery of the platform, the corresponding skirt sections however having vertical E-edge members or other suitable end structure to accommodate affixation of the other skirt sections which later are added to the remaining platform sections after the platform has been assembled.

The air lift pump driving motors 16 and propeller motor 94 sometimes are installed on the appropriate sections of the platform 11 of the vehicle before the platform sections are actually assembled into the platform, and in other instances installation is delayed until after the platform exists as a unit. When installed, the air lift pump motors 16 are supported directly on the corresponding power lift sections 15 and propeller motor 94 on the propulsion platform section 32. The air lift pumps 17, propellers 85 and 86, along with their supporting frameworks, are installed on the corresponding air inlet and propulsion sections before or after the platform is assembled, and like remarks apply to the walls of the cabin on the cabin platform section 21.

Thus it will be seen that through assembling various platform sections and adding the skirt, a platform vehicle is easily obtained which is characterized by having an air compression chamber on the underneath side. The ceiling of the compression chamber is formed by the under surfaces of the platform sections and the side wall of the chamber is formed by the skirt. The lower edge of the skirt preferably is a uniform distance below the ceiling of the compression chamber of the vehicle.

In operation, the lift motors 16 of the vehicle 10 are started and these motors drive the air pumps 17 in favor of having the pumps deliver air through their respective air ducts down into the compression chamber 10a. Motors 16 conveniently are started from the cabin by the pilot with the aid of a battery 220 (FIG. 15) which has one of its terminals grounded to the frame of the vehicle and the other of its terminals connected by leads 223 and 225 to the input sides of a bank of starter switches 221 which have outputs over individually corresponding leads 227 to the starters 16e of the motors, and the battery also is connected by leads 223 and 224 to the input sides of a bank of ignition switches 222 which have output over individually corresponding leads 226 to the ignitions 16d of the motors. The motors accordingly may be started independently and, further, throttle controls 230 are available in the cabin of the vehicle 10 which individually include suitable linkages 233 with the throttle valves of the carburetors 16c of the motors 16 so that the operating speeds of the motors may be remotely controlled by the pilot. As the motors are speeded up, air pressure in the compression chamber 10a increases until a unit pressure is reached and applied against the ceiling of the compression chamber which is sufficient to cause the vehicle to rise from the surface of the earth. The lifting pressure of the air in pounds per square inch then exceeds the opposing gross weight pressure of the vehicle in pounds per square inch. The vehicle rises vertically until at equilibrium height of the vehicle 10, the air volume pumped into the compression chamber and the air volume which escapes from under the lower edges of the skirt are equal. The height of the lower edge of the skirt above the surface from which the vehicle has risen with its load therefore is substantially a linear function of air pumping capability of the vehicle. In effect, an air cushion is formed under the vehicle platform and as this air which is under pressure moves out below the skirt, the air is replaced in the compression chamber by the pumps, and the vehicle accordingly remains stably airborne. Once this air bearing or cushion has been formed, it takes very little energy to move the vehicle over the surface of the earth. This movement is readily accomplished by means of the propulsion units.

The pilot may also start and control operation of the propulsion motor 94 from the cockpit and for this purpose a switch in the bank of starter switches 221 is employed to connect the battery 220 in circuit with the engine starter 94d over lead 228, while a switch in the bank of ignition switches 222 is available for closing circuit over lead 229 with the ignition 94e. A throttle control 232 is linked by suitable linkaged means 235 with the throttle valve 94c of the motor so that the motor may be speeded up and slowed down from the cabin. Also, a clutch control device 231 in the cabin is connected as by linkage 234 with clutch 94g for engaging the motor 94 drivingly with the propellers 85 and 86 when the clutch is engaged and for interrupting that drive when the clutch is disengaged. When motor 94 is disconnected from the propellers by disengagement of the clutch 94g, the vehicle 10 can hover in the air under the continued lifting effect produced by the air pumps 17 or can descend to the earth when the air pumps are slowed down in their operation.

Further, in accordance with the present embodiment, the thrust propellers for driving the vehicle in the air are variable pitch propellers through which steering of the vehicle is also accomplished. The blades 85b of propeller 85 extend radially from the hollow propeller shaft 85a and are journaled for axial rotation in bearings 85d at the hub end of the propeller shaft. Inside the propeller shaft 85a the blades have crank ends 85e which are engaged with longitudinal slide bar 200 by resting in an annular groove 200a in the inner end of the bar.

Blades 86b of propeller 86 are likewise journaled to shaft 86a at 86d and have crank ends 86e engaged in an annular groove 201a in the end of slide rod 201 associated with the corresponding propeller shaft.

Keyed respectively to the propeller shafts 85 and 86 are bevel gears 87a' and 88a' which mesh with and drive bevel gears 87b and 88b on the propeller shafts, and thus drive the propellers under power supplied by the propulsion motor 94.

Longitudinal slide bars 200 and 201, forward of the propeller shafts, are equipped with reversely acting screws 202 and 203 which are engaged with suitable threads in the casings of L-gear boxes 87 and 88. The slide bars are connected to rotate with pulleys 204 and 205 outside the gear boxes. In the particular instance it is assumed that the propellers 85 and 86 are driven in like directions of rotation by the motor 94 and that the blades 85b and 86b of the propellers are equally pitched as indicated in FIGURE 16 when the vehicle 10 is to be propelled in a dead ahead forward direction. A steering wheel 206 in the cabin of the vehicle has a shaft 207 which carries a pulley 208 that is driven by the wheel and shaft. Wound several times around pulley 208 for frictional engagement is an endless steering cable 209 which for example is guided by suitable horizontal and vertical guide pulleys 210 and 211 to pass around and frictionally engage aft steering pulley 212 keyed to shaft 213, the latter shaft is suitably journaled to the vehicle body. Pulleys 214 and 215 keyed to shaft 213 respectively carry V-belts 216 and 217 drivingly engaged with pulleys 204 and 205 of the longitudinal slide bars 200 and 201. A rotation of the steering wheel 206 to the left as viewed in FIGURE 15 causes pulley 204 to rotate the screw 202 in an entering direction with respect to the housing of gear box 87, accordingly driving the longitudinal slide bar 200 in an aft direction to rotate blades 85b by their crank ends 85e toward the zero pitch position indicated in FIGURE 17 and corresponding to a full left turn position of the steering wheel 206. Meanwhile screw 203 through having a reverse thread as compared with screw 202 is rotated outward from the housing of L-gear box 88 under the drive of pulley 205, which ultimately doubles the pitch of blades 86b as shown in FIGURE 17 corresponding to the extreme left hand position of steering wheel 206 and as compared with the pitch of blades in the dead ahead propulsion condition indicated in FIGURE 16. The difference in pitch of blades 85b and 86b so produced causes the vehicle to veer to the left. A reverse rotation of the steering wheel 206 by the pilot causes the blades 85b and 86b to resume the FIGURE 16 position, but by turning the steering wheel still farther to the right the vehicle veers to the right under the thrust propulsion of the propellers 85 and 86 as the blades 85b and 86b move progressively from the FIGURE 16 position to the FIGURE 18 position, producing an ever increasing thrust differential favoring yaw to the right. Of course, rotation of the steering wheel to the left brings the blades back to the FIGURE 16 position for dead ahead travel once more.

By way of specific illustration, a vehicle in accordance with the present invention, equipped with four air pumps having bladed impellers of six foot diameter, is driven by four individually corresponding 270 h.p. internal combustion engines adapted for marine use, and affords a platform approximately 32 feet wide and 52 feet long for cargo use. The gross weight of the vehicle is approximately fifteen thousand pounds and the platform sections are about two feet thick, assembled with a skirt projecting about two feet below the ceiling of the air compression chamber under the platform sections. In FIGURE 14, a graph is presented wherein gross estimated weight in thousands of pounds of the vehicle is the abscissa, and height of the lower edge of the skirt off the surface of the earth in inches is the ordinate. The gross estimated weight takes into account that of the vehicle and also cargo load. The vehicle will rise and become airborne with only one of the four lift pumps on board in operation. Since the lift pumps employed and their corresponding motors in accordance with the graph are of like rating, the comparison of the effect of having one or more of the engines in operation can be compared. It will be seen that with one of the lift pumps alone in operation at 750 r.p.m. under full throttle drive of its corresponding motor, the craft will be airborne, although the distance above the earth is considerably less than when at least one additional pump is brought into operation. With all four engines driving their lift pumps and with the engines operating at full throttle, the vehicle will rise somewhere between three and four feet while carrying a very considerable cargo load.

Additional or fewer lift air inlet platform sections 15, with corresponding pumps 17 having motors 16, may accordingly be employed in a vehicle depending upon maximum cargo load, and the desired maximum height of lift of the vehicle that is to be accomplished. Sometimes in accordance with the invention the same rated platform area is preserved under conditions of reduce available lifting power by substituting one or more of the area-increasing sections 20 for lift air inlet platform sections 15. A very considerable flexibility over assembly exists on this basis, even down to using but a single lift air inlet platform section 15 in the vehicle along with a single pump 17 and motor 16. The permissible variety of combinations of platform sections permits great latitude over the sizes and power capacities of the resulting vehicles. In omitting or adding certain of the platform sections to alter platform size, the skirt sections may likewise be omitted or added, for example through standardizing the skirt section sizes commensurate with the length of the sides of the platform sections which contribute to the periphery of the platform.

It will also be seen that by providing platform vehicles which have platform sections that exclude water from the insides of the sections and are buoyant in water, the vehicles have great value for marine use and usually along with this property readily lend themselves to amphibian use. Thus, in certain instances the buoyant platform vehicles are employed to float on water, rise above the water, and travel under propulsion to other points where landings are made on water or land. Some of the craft in accordance with the invention are primarily for land use and while they can travel over water should not be brought down on water. Therefore, in some instances, the property of buoyance of the platform for water use is sometimes dispensed with, still with very appreciable advantages being had through the construction of strictly land vehicles. Even in vehicles for over land use alone, a foam resin filling or the like in the sections frequently is used for the strength that it contributes to the platform. Sometimes, the skirts on the vehicles are employed as the landing gear, and for this the skirts are made strong enough to support the craft when the skirt edge contacts the ground. In other instances landing gear in the form of wheels is added to the platform. Vehicles which are built for use on water advantageously are constructed to remain afloat with reliance upon a buoyant platform, and the skirt conveniently immerses in the water when the craft is brought down.

As many possible embodiments may be made, and as many changes may be made in the embodiments hereinbefore set forth, it will be distinctly understood that all matter described herein is to be interpretated as illustrative and not as a limitation.

I claim:

1. A vehicle adapted to be raised from the surface of water by gas pressure and travel sustained in the air while forming a lift gap with said surface from low altitude, said vehicle comprising a body, said body including a platform having the top and bottom sides thereof respectively substantially entirely above and substantially entirely below a same plane intermediate said top and bottom sides, the area of said top side coextending with lift area of said bottom side substantially to the perimeter of said platform and said areas in terms of area in horizontal plan being approximately equal to each other, and said platform itself bodily being a buoy above said lift area to sustain the vehicle afloat with said lift area contacting the water and with said top area raised above the water when the vehicle is brought down on water, and a downwordly extending water-immersible rigid impermeable skirt immovably fixed to said platform forming substantially a surround for said lift area contiguous to the perimeter of said platform and contiguous to the perimeter of said lift area and for downwardly open plenum space having said lift area for a ceiling, said skirt having a bottom inside periphery located horizontally outwardly on the vehicle relative to about all of said lift area and said bottom periphery being throughout substantially in a plane generally parallel to said platform, and means for vertically lifting, horizontally propelling and steering the vehicle, said means including pressurizing means on the vehicle and communicating with said plenum space for maintaining gas under pressure in said space and in cushion under said lift area for lifting the vehicle, from a position where said skirt is immersed in water and said platform is afloat on the water, upward only in the region of ground effect and supporting the vehicle into a hovering position with said bottom periphery of the skirt forming with the surface of the water a lift gap which gap under given load on the vehicle has magnitude varying with gas pressure then available in total from said pressurizing means for lifting the vehicle in view of amounts of said gas escaping from said plenum space to the atmosphere, and said first mentioned means further including steering and horizontal propulsion means on the vehicle for the vehicle to be steered and horizontally propel itself through the air above said surface while supply of gas to said plenum space is continued from said pressurizing means to support said platform with said skirt forming a lift gap with said surface.

2. A vehicle adapted to be raised from the surface of water by gas pressure and travel sustained in the air while forming a lift gap with said surface from low altitude, said vehicle comprising a body, said body including a platform having the top and bottom sides thereof respectively substantially entirely above and substantially entirely below a same plane intermediate said top and bottom sides, the area of said top side coextending with lift area of said bottom side substantially to the perimeter of the platform and said areas in terms of area in horizontal plan being approximately equal to each other, said platform itself bodily being a buoy above said lift area to sustain the vehicle afloat with said lift area contacting the water and with said top area raised above the water when the vehicle is brought down on water, and said platform having an opening therethrough communicating with said lift area, and a downwardly extending water-immersible rigid impermeable skirt immovably fixed to said platform forming substantially a surround for said lift area contiguous to the perimeter of said platform and contiguous to the perimeter of said lift area and for downwardly open plenum space having said lift area for a ceiling, said skirt having a bottom inside periphery located horizontally outwardly on the vehicle relative to about all of said lift area and said bottom periphery being throughout substantially in a plane generally parallel to said platform, and means for vertically lifting, horizontally propelling and steering the vehicle, said means including pressurizing means on the vehicle and communicating with said plenum space for maintaining gas under pressure in said space and in cushion under said lift area for lifting the vehicle, from a position where said skirt is immersed in water and said platform is afloat on the water, upward only in the region of ground effect and supporting the vehicle into a hovering position with said bottom periphery of the skirt forming with the surface of the water a lift gap which gap under given load on the vehicle has magnitude varying with gas pressure then available in total from said pressurizing means for lifting the vehicle in view of amounts of said gas escaping from said plenum space to the atmosphere, said pressurizing means comprising an air impeller rotatably mounted on said platform and associated with said platform opening for moving air through said opening into said plenum space, and a motor mounted on said platform and having drive connection with said impeller for rotating said impeller, and said first mentioned means further including steering and horizontal propulsion means on the vehicle for the vehicle to be steered and horizontally propel itself through the air above said surface while supply of gas to said plenum space is continued from said pressurizing means to support said platform with said skirt forming a lift gap with said surface.

3. A vehicle adapted to be raised from the surface of water by gas pressure and travel sustained in the air while forming a lift gap with said surface from low altitude, said vehicle comprising a body, said body including a platform having the top and bottom sides thereof respectively substantially entirely above and substantially entirely below a same plane intermediate said top and bottom sides, the area of said top side coextending with lift area of said bottom side substantially to the perimeter of the platform and said areas in terms of area in horizontal plan being approximately equal to each other, said platform itself being a buoy above said lift area to sustain the vehicle afloat with said lift area contacting the water and with said top area raised above the water when the vehicle is brought down on water, and said platform having a plurality of spaced apart locations in each of which an opening extends through the platform and communicates with said lift area, and a downwardly extending water-immersible rigid impermeable skirt immovably fixed to said platform forming substantially a surround for said lift area contiguous to the perimeter of said platform and contiguous to the perimeter of said lift area and for downwardly open plenum space having said lift area for a ceiling, said skirt having a bottom inside periphery located horizontally outwardly on the vehicle relative to about all of said lift area and said bottom periphery being throughout substantially in a plane generally parallel to said platform, and means for vertically lifting, horizontally propelling and steering the vehicle, said means including pressurizing means on the vehicle and communicating with said plenum space for maintaining gas under pressure in said space and in cushion under said lift area for lifting the vehicle, from a position where said skirt is immersed in water and said platform is afloat on the water, upward only in the region of ground effect and supporting the vehicle into a hovering position with said bottom periphery of the skirt forming with the surface of the water a lift gap which gap under given load on the vehicle has magnitude varying with gas pressure then available in total from said pressurizing means for lifting the vehicle in view of amounts of said gas escaping from said plenum space to the atmosphere, said pressurizing means comprising a plurality of motor air-impeller sets corresponding in number to the number of said platform locations and mounted on the platform adjacent to said platform openings at said locations, and the impeller of each set being associated with the corresponding said opening for moving air through said opening into the plenum space under the drive of the corresponding motor, and said first mentioned means further including steering and horizontal propulsion means on the vehicle for the vehicle to be steered and horizontally propel itself through the air above said surface while supply of gas to said plenum space is continued from said pressurizing means to support said platform with said skirt forming a lift gap with said surface.

4. A vehicle adapted to be raised from the surface of water by gas pressure and travel sustained in the air while forming a lift gap with said surface from low altitude, said vehicle comprising a body, said body including a platform having the top and bottom sides thereof respectively substantially entirely above and substantially entirely below a same plane intermediate said top and bottom sides, the area of said top side coextending with lift area of said bottom side substantially to the perimeter of the platform and said areas in terms of area in horizontal plan being approximately equal to each other, said platform itself bodily being a buoy above said lift area to sustain the vehicle afloat with said lift area contacting the water and with said top area raised above the water when the vehicle is brought down on water, and said platform having a plurality of spaced apart locations in each of which an opening extends through the platform and communicates with said lift area, a cabin on said platform, and a downwardly extending water-immersible rigid impermeable skirt immovably fixed to said platform forming substantially a surround for said lift area contiguous to the perimeter of said platform and contiguous to the perimeter of said lift area and for downwardly open plenum space having said lift area for a ceiling, said skirt having a bottom inside periphery located horizontally outwardly on the vehicle relative to about all of said lift area and said bottom periphery being throughout substantially in a plane generally parallel to said platform, and means for vertically lifting, horizontally propelling and steering the vehicle, said means including pressurizing means on the vehicle and communicating with said plenum space for maintaining gas under pressure in said space and in cushion under said lift area for lifting the vehicle, from a position where said skirt is immersed in water and said platform is afloat on the water, upward only in the region of ground effect and supporting the vehicle into a hovering position with said bottom periphery of the skirt forming with the surface of the water a lift gap which gap under given load on the vehicle has magnitude varying with gas pressure then available in total from said pressurizing means for lifting the vehicle in view of amounts of said gas escaping from said plenum space to the atmosphere, said pressurizing means comprising a plurality of motor air-impeller sets corresponding in number to the number of said platform locations and mounted on the platform adjacent to said platform openings at said locations, and the impeller of each set being associated with the corresponding said opening for moving air through said opening into the plenum space under the drive of the corresponding motor, and each said motor having a throttle interconnected with an individually corresponding throttle control in said cabin for the quantity of air delivered to said plenum space by the corresponding impeller to be varied, and said first mentioned means further including steering and horizontal propulsion means on the vehicle, and steering and propulsion controls in said cabin interconnected with said steering and horizontal propulsion means for the vehicle to be steered and horizontally propel itself through the air above said surface while supply of gas to said plenum space is continued from said pressurizing means to support said platform with said skirt forming a lift gap with said surface.

5. A vehicle adapted to be raised from the surface of water by gas pressure and travel sustained in the air while forming a lift gap with said surface from low altitude, said vehicle comprising a body, said body including a platform which comprises a lattice-work frame having lattice-work openings, a filling of low density, water-repellent material in the form of a solid having closed voids inside said lattice-work openings and integrally bonded to said frame and thus reinforcing said frame, top covering over said frame and filling, said platform having top area coextending with and generally parallel to bottom lift area of the platform substantially to the perimeter of the platform and said areas in terms of horizontal plan area being approximately equal to each other and respectively being substantially entirely above and substantially entirely below a same plane intermediate said areas, and said platform being a buoyant structure to sustain the vehicle afloat with said lift area contacting the water when the vehicle is brought down on water, and a downwardly extending water-immersible rigid impermeable skirt immovably fixed to said platform forming substantially a surround for said lift area contiguous to the perimeter of said platform and contiguous to the perimeter of said lift area and for downwardly open plenum space having said lift area for a ceiling, said skirt having a bottom inside periphery located horizontally outwardly on the vehicle relative to about all of said lift area and said bottom periphery being throughout substantially in a plane generally parallel to said platform, and means for vertically lifting, horizontally propelling and steering the vehicle, said means including pressurizing means on the vehicle and communicating with said plenum space for maintaining gas under pressure in said space and in cushion under said lift area for lifting the vehicle, from a position where said skirt is immersed in water and said platform is afloat on the water, upward only in the region of ground effect and supporting the vehicle into a hovering position with said bottom periphery of the skirt forming with the surface of the water a lift gap which gap under given load on the vehicle has magnitude varying with gas pressure then available in total from said pressurizing means for lifting the vehicle in view of amounts of said gas escaping from said plenum space to the atmosphere, and said means for vertically lifting, horizontally propelling and steering the vehicle further including steering and horizontal propulsion means on the vehicle for the vehicle to be steered and horizontally propel itself through the air above said surface while supply of gas to said plenum space is continued from said pressurizing means to support said platform with said skirt forming a lift gap with said surface.

6. A vehicle adapted to be raised from the surface of water by gas pressure and travel sustained in the air while forming a lift gap with said surface from low altitude, said vehicle comprising a body, said body including a platform which comprises top covering and bottom covering and low density, water-repellent material in the form of a solid having closed voids between said coverings, said platform having top area coextending with and generally parallel to bottom lift area of the platform substantially to the perimeter of the platform and said areas in terms of horizontal plan area being approximately equal to each other and respectively being substantially entirely above and substantially entirely below a same plane intermediate said areas, and said platform being a buoyant structure to sustain the vehicle afloat with said lift area contacting the water when the vehicle is brought down on water, and a downwardly extending water-immersible rigid impermeable skirt immovably fixed to said platform forming substantially a surround for said lift area contiguous to the perimeter of said platform and contiguous to the perimeter of said lift area and for downwardly open plenum space having said lift area for a ceiling, said skirt having a bottom inside periphery located horizontally outwardly on the vehicle relative to about all of said lift area and said bottom periphery being throughout substantially in a plane generally parallel to said platform, and means for vertically lifting, horizontally propelling and steering the vehicle, said means including pressurizing means on the vehicle and communicating with said plenum space for maintaining gas under pressure in said space and in cushion under said lift area for lifting the vehicle, from a position where said skirt is immersed in water and said platform is afloat on the water, upward only in the region of ground effect and supporting the vehicle into a hovering position with said bottom periphery of the skirt forming with the surface of the water a lift gap which gap under given load on the vehicle has magnitude varying with gas pressure then available in total from said pressurizing means for lifting the vehicle in view of amounts of said gas escaping from said plenum space to the atmosphere and said means for vertically lifting, horizontally propelling and steering the vehicle further including steering and horizontal propulsion means on the vehicle for the vehicle to be steered and horizontally propel itself through the air above said surface while supply of gas to said plenum space is continued from said pressurizing means to support said platform with said skirt forming a lift gap with said surface.

7. A vehicle adapted to be raised from the surface of water by gas pressure and travel sustained in the air while forming a lift gap with said surface from low altitude, said vehicle comprising a body, said body including a platform having the top and bottom sides thereof respectively substantially entirely above and substantially entirely below a same plane intermediate said top and bottom sides, the area of said top side coextending with lift area of said bottom side substantially to the perimeter of the platform and said areas in terms of area in horizontal plan being approximately equal to each other, and said platform being substantially symmetrical on the perimeter with respect to the fore and aft center line of the platform and bodily itself being a buoy above said lift area to sustain the vehicle afloat with said lift area contacting the water and with said top area raised above the water when the vehicle is brought down on water, and a downwardly extending, water-immersible rigid impermeable skirt immovably fixed to said platform forming substantially a surround for said lift area contiguous to the perimeter of said platform and contiguous to the perimeter of said lift area and for downwardly open plenum space having said lift area for a ceiling, said skirt having a bow in which portions of said skirt diverge from each other aft substantially symmetrically with respect to the fore and aft center line of the platform, and said skirt having a bottom inside periphery located horizontally outwardly on the vehicle relative to about all of said lift area and said bottom periphery being throughout substantially in a plane generally parallel to said platform, and means for vertically lifting, horizontally propelling and steering the vehicle, said means including pressurizing means on the vehicle and communicating with said plenum space for maintaining gas under pressure in said space and in cushion under said lift area for lifting the vehicle, from a position where said skirt is immersed in water and said platform is afloat on the water, upward only in the region of ground effect and supporting the vehicle into a hovering position with said bottom periphery of the skirt forming with the surface of the water a lift gap which gap under given load on the vehicle has magnitude varying with gas pressure then available in total from said pressurizing means for lifting the vehicle in view of amounts of said gas escaping from said plenum space to the atmosphere, and said first mentioned means further including steering and horizontal propulsion means on the vehicle for the vehicle to be steered and horizontally propel itselfg through the air in a forward direction above said surface while supply of gas to said plenum space is continued from said pressurizing means to support said platform with said skirt forming a lift gap with said surface and for the vehicle to be steered and propel itself in a forward direction when said platform is afloat on water with said rigid skirt immersed in bow contact with the water.

8. A vehicle adapted to be raised from the surface of water by gas pressure and travel sustained in the air while forming a lift gap with said surface from low altitude, said vehicle comprising a body, said body including a platform having the top and bottom sides thereof respectively substantially entirely above and substantially entirely below a same plane intermediate said top and bottom sides, said platform having a bow diverging in width aft substantially symmetrically with respect to the fore and aft center line of the platform, the area of said top side of the platform coextending with lift area of said bottom side substantially to the perimeter of the platform and said areas in terms of area in horizontal plan being approximately equal to each other, and said platform itself bodily being a buoy above said lift area to sustain the vehicle afloat with said lift area contacting the water and with said top area raised above to water when the vehicle is brought down on water, and a downwardly extending water-immersible rigid impermeable skirt immovably fixed to said platform forming substantially a surround for said lift area contiguous to the perimeter of said platform and contiguous to the perimeter of said lift area and for downwardly open plenum space having said lift area for a ceiling, said skirt having a bow in which portions of said skirt diverge from each other aft substantially symmetrically with respect to the fore and aft center line of the platform and extend downwardly from said bow of the platform, and said skirt having a bottom inside periphery located horizontally outwardly on the vehicle relative to about all of said lift area and said bottom periphery being throughout substantially in a plane generally parallel to said platform, and means for vertically lifting, horizontally propelling and steering the vehicle, said means including pressurizing means on the vehicle and communicating with said plenum space for maintaining gas under pressure in said space and in cushion under said lift area for lifting the vehicle, from a position where said skirt is immersed in water and said platform is afloat on the water, upward only in the region of ground effect and supporting the vehicle into a hovering position with said bottom periphery of the skirt forming with the surface of the water a lift gap which gap under given load on the vehicle has magnitude varying with gas pressure then available in total from said pressurizing means for lifting the vehicle in view of amounts of said gas escaping from said plenum space to the atmosphere, and said first mentioned means further including steering and horizontal propulsion means on the vehicle for the vehicle to be steered and horizontally propel itself through the air in a forward direction above said surface while supply of gas to said plenum space is continued from said pressurizing means to support said platform with said skirt forming a lift gap with said surface and for the vehicle to be steered and propel itself in a forward direction when said platform is afloat on water with said rigid skirt immersed in bow contact with the water.

References Cited in the file of this patent
UNITED STATES PATENTS

| | | |
|---|---|---|
| 936,395 | Worthington | Oct. 12, 1909 |
| 1,000,152 | Correll | Aug. 8, 1911 |
| 2,024,822 | Hort | Dec. 17, 1935 |
| 2,322,790 | Cristadoro | June 29, 1943 |
| 2,417,508 | Leyde | Mar. 18, 1947 |
| 2,567,392 | Naught | Sept. 11, 1951 |
| 2,605,733 | Smith | Aug. 5, 1952 |
| 2,736,514 | Ross | Feb. 28, 1956 |
| 2,751,038 | Acheson | June 19, 1956 |
| 2,773,468 | Besse | Dec. 11, 1956 |
| 2,847,961 | Meckenstock | Aug. 19, 1958 |
| 2,884,633 | Stahmer | Apr. 28, 1959 |
| 2,918,183 | Petersen et al. | Dec. 22, 1959 |
| 2,955,780 | Hulbert | Oct. 11, 1960 |

OTHER REFERENCES

Article appearing in the Washington, D.C. "Evening Star", issue of October 9, 1959, page B–8, columns 1 and 2, entitled "Test 'Flight' Nearing for Air Borne Boat".